(12) United States Patent
Zhou

(10) Patent No.: US 7,429,368 B2
(45) Date of Patent: Sep. 30, 2008

(54) PROCESS FOR SYNTHESIZING METAL BOROHYDRIDES

(76) Inventor: Yu Zhou, 11 Lafayette Pl., 2nd floor, Kearny, NJ (US) 07032

( * ) Notice: Subject to any disclaimer, the term of this patent is extended or adjusted under 35 U.S.C. 154(b) by 200 days.

(21) Appl. No.: 09/778,997

(22) Filed: Feb. 8, 2001

(65) Prior Publication Data
US 2005/0207959 A1 Sep. 22, 2005

(51) Int. Cl.
*C01B 6/15* (2006.01)
(52) U.S. Cl. .................................................. 423/286
(58) Field of Classification Search ................ 423/286
See application file for complete search history.

(56) References Cited

U.S. PATENT DOCUMENTS

| | | | | |
|---|---|---|---|---|
| 2,729,540 A | * | 1/1956 | Fisher | 423/286 |
| 2,784,053 A | * | 3/1957 | Cunningham et al. | 423/286 |
| 2,970,114 A | * | 1/1961 | Bragdon | 423/286 |
| 3,111,372 A | * | 11/1963 | Köster | 423/286 |
| 3,152,861 A | * | 10/1964 | Logan et al. | 423/286 |
| 3,734,842 A | * | 5/1973 | Cooper | |
| 4,193,978 A | * | 3/1980 | Muller et al. | 423/286 |
| 5,294,423 A | * | 3/1994 | Lorthioir et al. | 423/286 |

* cited by examiner

*Primary Examiner*—Wayne A. Langel
(74) *Attorney, Agent, or Firm*—Blakely, Sokoloff, Taylor & Zafman LLP

(57) ABSTRACT

A process for synthesizing metal borohydride especially sodium borohydride directly from borax by the use of proton H at room temperature and pressure. Said process comprising the steps of:

Providing proton H by the use of metals or alloys that can form hydrides with hydrogen. In this case, the metals or alloys are the carriers of proton H Proton H also can be provided from hydrogen gas by the use of catalysts located on the surface of carriers.

Making the proton H enters the lattice of boron oxides

Removing the oxygen from the lattice of boron oxides by the use of the carriers.

14 Claims, 2 Drawing Sheets

PROCESS FOR SYNTHESIZING METAL BOROHYDRIDES

BACKGROUND OF THE INVENTION

This invention relates generally to the field of synthesizing metal borohydrides and more particularly to a process for synthesizing sodium borohydrides and its alkali solution.

The metal borohydrides especially alkali metal borohydrides such as $KBH_4$, $LiBH_4$ and $NaBH_4$ are unique compounds in their ability to carry large amounts of hydrogen. They can be stabilized by dissolving into alkali solution. They can release hydrogen gas by the use of catalysts such as Cu, Co, Ni etc if needed. When reacting with water, 1 molar of $KBH_4$ or $NaBH_4$ can produce 4 molars of pure hydrogen gas in which 2 molars of hydrogen come from borohydrides and the other 2 molars come from water. The theoretical capacity of hydrogen storage in $NaBH_4$ is high up to 21 wt % because water also becomes carrier of hydrogen in this case. Therefore, the metal borohydride alkali solutions offer great potential as a fuel in fuel cell systems or any other applications when such effect is desired. In addition, as atoms H in metal borohydrides are −1 value, which has excellent reducing characteristics, therefore, in theory, metal borohydrides especially alkali metal borohydrides should find their applications in almost every field where reducing agent is needed.

The metal borohydrides have not obtained their expected widespread usage simply because of their high costs. As said in U.S. Pat. No. 3,734,842, "the selling price of sodium borohydride", a kind of metal borohydrides can be used to further produce other metal borohydrides, "produces in accordance with conventional industrial processes is necessarily pegged to the cost of metallic soduim". The reaction now employed for the production of sodium borohydride in industry as below:

$$4\ NaH+(CH_3O)_3B=NaBH_4+3\ NaOCH_3$$

One molar sodium borohydride needs 4 molars metallic sodium conventional industrial process. This process by the use of metallic sodium to produce metal borohydrides was described clearly in details in the article titled "Na borohydride: Can cost be lowered?", Canadian Chemical Processing, 47, No. 12, 57-59 and 62 (1963) and U.S. Pat. No. 3,473,899. U.S. Pat. Nos. 3,734,842, 4,931,154 and 5,804,329 described another method to produce metal borohydrides by the use of electrochemical cells. In these kinds of methods, a cathode, an anode and membrane were used and borohydrides were said to be produced from borate ions directly. However, once borate ions are reduced to borohydride ions, OH ions are produced also and then negative borate ions and OH-ions will be co-existing in electrolyte, whichever the electrolyte is aqueous solution or not, $OH^-$ is prior to borate ions to be produced into water. This will result in a very difficult to further produce borohydride ions and even can be produced; the efficiency of making borohydrides ions will be too low to be practically used in industries. Therefore, in the past 50 years many efforts have been put in trying to reduce the costs of metal borohydrides but by now the production of metal borohydrides in industry scale is still pegged by metallic sodium. Consequently, the costs are still very high.

SUMMARY OF THE INVENTION

Figure 1:
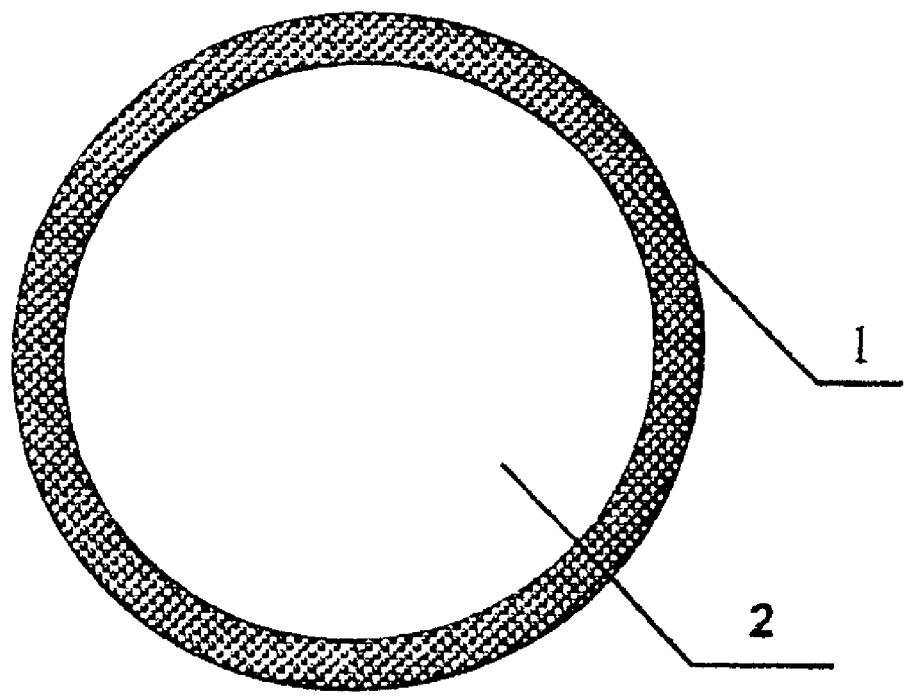
FIG. 1 is an illustration of a cross-sectional view of a carrier.

One object of the invention is to provide a cheaper production of metal borohydrides especially Sodium borohydride by the use of proton H to replace metallic sodium.

Another object is to provide a novel method for synthesizing sodium borohydride under ambient temperature and pressure.

A further object of the invention is to provide a novel method for synthesizing sodium borohydride directly from borax but not from $(CH_3O)_3B$. This will further reduce the cost of synthesizing metal borohydrides.

Other objects and advantages of the present invention will become apparent from the following description, taken in connection with the accompanying drawings disclosed.

The invention provides a simple, novel and low cost technology for reducing metal borohydrides especially sodium borohydride directly from borax or $NaBO_2$ by the use of proton H but not metallic sodium. The metal borohydrides such as but not limited to $KBH_4$, $NaBH_4$ and $LiBH_4$ are synthesized simply by a mechanical chemical method that contains the following processes.

A. Process of Synthesizing the Carriers of Proton H or the Carriers of Catalysts for Splitting Hydrogen Gas as Proton H.

Mechanically mixing and pulverizing metals such as Mg, V, Zr, Ti, La, Y, Ce, Ca, Nb etc or their alloys with 0-50 wt % hydrogen storage alloys such as but not limited to FeTi to make the hydrogen storage alloys locate on the surface of above metal powders.

Mechanically mixing and pulverizing the mixed powders described as mentioned above with 0-100 wt % alkali materials such as but not limited to NaOH or KOH.

Surface capillary treatment. Put the powders produces by the above processes under water vapor with 0-1 atm for 0-48 hours. After this process, the surface of the powder should have metallography characteristics shown in FIG. 1 and FIG. 2.

Or mechanically mixing and pulverizing metals such as Al, Fe, Mg, Zn, V, Zr, Ti, La, Y, Ce, Ca, Nb etc or their alloys with 0-10 wt % Pt or Pd coated carbon black to make the Pt or Pd coated carbon black locate on the surface of above powders.

B. Process for Generating and Supplying Proton H.

Keeping the powders produces from the above processes under 0-50 atm pressure hydrogen gas at from ambient temperature to 400° C. for 0-48 hours.

Or by the use of electrochemical or any other methods to produce proton H.

C. Process of Synthesizing Metal Borohydrides.

Mechanically mixing and pulverizing non-aqueous metal boron oxides or borax with the powders produced by process A and B under 0-50 atm hydrogen gas existing at ambient temperature to 400° C. for 0-48 hours.

D. Process of Synthesizing Borohydride Alkali Solution or Pure Metal Borohydrides Add alkali such as but not limited to KOH and NaOH solutions with concentration from 0.5 wt % to saturate into the powders produces through the above processes A, B and C.

Filter precipitates to obtain metal-borohydride alkali solutions.

Or dissolve the powder produces through the above process A, B and C into liquid ammonia or any liquids that can dissolve metal borohydrides.

Filter precipitates and evaporate these liquids such as ammonia to obtain pure metal borohydride.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed description of the preferred embodiments are provided herein. It is to be understood, however, that the present invention may be embodies in various forms. Therefore, specific details disclosed here in are not to be interpreted as limiting but rather as a basis for the claims and as a representative basis for teaching one skilled in the art to employ the present invention in virtually any appropriately detailed system, structure or manner.

According to the present invention, a process for synthesizing metal borohydride comprising the following 4 steps (using carriers of Mg, Al and FeTi as example):

The first step is a process of synthesizing the carriers of proton H or the carriers of catalysts for splitting hydrogen gas as proton H. In order to synthesize the carriers of proton H, the metals that can form hydrides with hydrogen such as Mg is mixed with 0-50 wt % hydrogen storage alloys such as but not limited to FeTi or LaNi$_5$ alloy, then pulverize them mechanically under 0-50 atm hydrogen. After this, add 0-100 wt % KOH or NaOH into this powder and mechanically pulverized them to ensure the hydrogen storage alloys and KOH or NaOH locate on the surface of, such as but not limited to Mg powder. In other words, after this process the Mg powder is characterized by a special structure in that on the surface there is a Mg—FeTi—NaOH composition layer while in the center, only pure Mg. The structure of carriers is shown in FIG. 1. After finished this, putting these powders under water vapor with 0-1 atm for surface capillary treatment.

Figure 2:
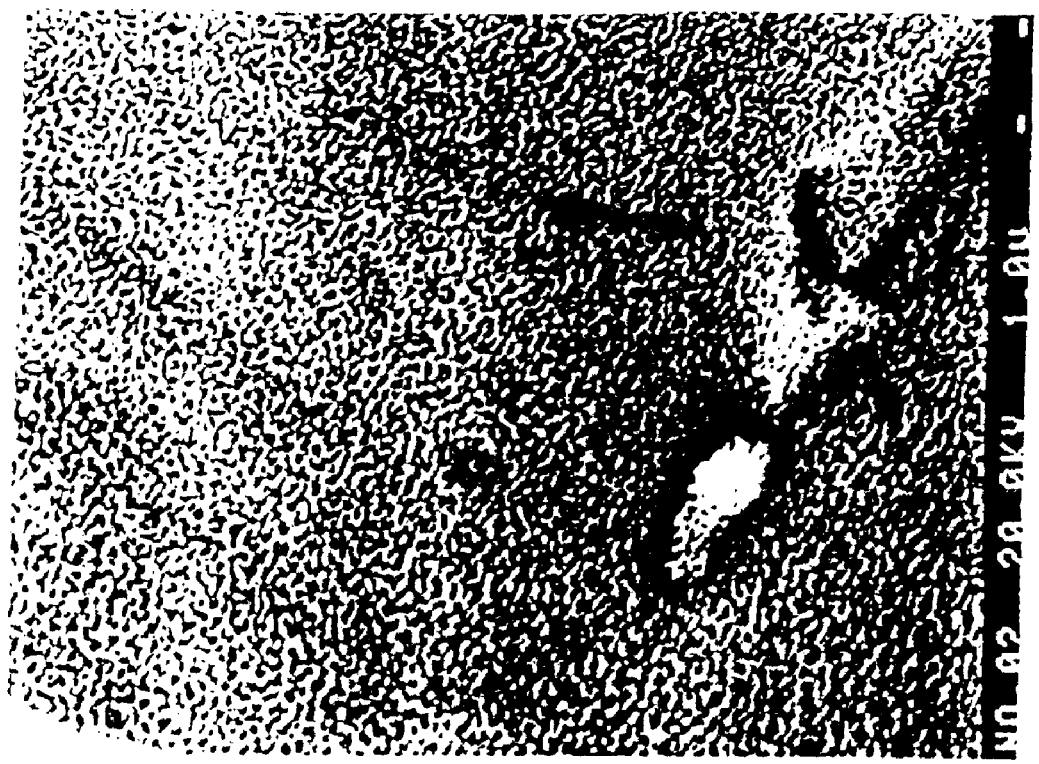
FIG. 2 is an electric probe micro-analyzer (FPMA) image illustrating the surface characteristics of a carrier.

FIG. 2 shows the surface characteristics.

By now the carriers have the following properties: (1) The capillary treated surface has excellent affinity for proton H; (2). As Hydrogen storage alloys such as FeTi, LaNi$_5$ etc. have a far lower pressure for taking up hydrogen than Mg, if these carriers of proton H are put into a given pressure hydrogen gas, hydrogen gas molecules will first be absorbed on the surface of carriers by the alloy. The hydrogen gas is then split into proton H to enter the Mg—FeTi—NaOH composition layer to form hydride. Finally the proton H is diffused to enter the lattice of Mg to form MgH$_2$ hydride. (3) After the carriers fully become hydride, the outer layer of carriers has a saturate proton H concentration because the hydrogen storage alloys located on the outer layer has lower equilibrium pressure of hydrogen than Mg located in center. (4) Because the surface of carriers has good affinity to proton H, the surface proton H will be stable to stay in the Mg—FeTi—NaOH composition layer until we need these proton H to remove the carriers surface by the foreign force.

In order to synthesize the carriers of catalysts for splitting hydrogen gas as proton H, or Pt or Pd coated carbon black is mixed and pulverized mechanically with aluminum or other metals that can form oxides but difficult to form hydrides with hydrogen. After finishing this process, the Pt or Pd coated carbon black will locate on the surface of aluminum. In this case, the surface will be associated with the production of proton H from splitting hydrogen gas molecule.

The second step is the process of generating and supplying proton H in that providing proton H by the use of metals or alloys that can form hydrides with hydrogen. In this case, the metals or alloys are the carriers of proton H; Or providing proton H from splitting hydrogen gas by the use of catalysts located on the surface of carriers.

In order to do this, keeping the powders produced from the above processes under 0-50 atm pressure hydrogen gas at from ambient temperature to 400° C. for 0-48 hours. In such cases as the carriers of proton H is Mg—FeTi, proton H will be produced by hydrogen storage alloys located on the surface first and then stored in this alloys and center Mg. While in the case such as to use Pt or Pd coated carbon black/Al carriers, proton H will be produced only on the surface and can not be stored in the carriers.

The third step is a process of synthesizing metal borohydrides in that making the proton H enter the lattice of boron oxides and removing the oxygen from the lattice of boron oxides by the use of carriers.

In order to do this, mechanically mixing and pulverizing non-aqueous metal boron oxides or borax with the powders produced by the above two processes under 0-50 atm hydrogen gas existing at from ambient temperature to 400° C. for 0-48 hours.

The above processes can be shown as the following reactions (take NaBO$_2$ and borax Na$_2$B$_4$O$_7$ as examples of the metal boron oxides in this category)

$$H_2 \rightarrow H \text{ (proton)} \tag{1}$$

$$NaBO_2 4H \text{ (proton)} \rightarrow NaBO_2(4H) \text{ (proton H enters the lattice of NaBO}_2\text{)} \tag{2}$$

$$NaBO_2(4H+2Mg \rightarrow 2MgO+NaBH_4 \text{ or}$$

$$Na_2B_4O_7 \text{ (8H)} + 4MG \rightarrow 2NaBH_4 + Mg_3(BO_3)_2 + MgO \tag{3}$$

$$3NaBO_2(4H) + 4Al \rightarrow 2Al_2O_3 + 3NaBH_4 \text{ or}$$

$$3Na_2B_4O_7 \text{ (8H)} + 8Al \rightarrow 6NaBH_4 + 2Al(BO_2)_3 + 3Al_2O_3 \tag{4}$$

The last step is a process of synthesizing metal borohydride alkali solution or pure metal borohydrides.

Just adding alkali such as but not limited to KOH and NaOH solutions with concentration from 0.5 wt % to saturate into the powders produces through the above three processes. Filter precipitates to obtain metal borohydride alkali solutions. Or dissolve the powder produced through the three processes into liquid ammonia. Filter precipitates and evaporate liquid ammonia to obtain pure metal borohydride.

EXAMPLE 1

Mechanically mix 60 g Magnesium powder with 3 g FeTi allow powder and pulverize them in a closed container under 5-atm hydrogen protection for 1 hour. Adding 3 g NaOH into the above container and mechanically pulverize them at the same condition for 1 hour. Vacuum this container first and then pipe water vapor into this container to keep pressure at 0.5 atm for 1 hour. After these steps, the powder has surface characteristics as shown in FIG. 1 and FIG. 2.

Vacuum this container first. Pipe hydrogen gas into this container to keep the pressure at 473 K, 50 atm for 24 hours.

Leaking the container to 1 atm. Add non-aqueous sodium boron oxide NaBO$_2$ 65.8 g into this container. Mechanically mix and pulverize them at ambient temperature, 5 atm hydrogen gas for 3 hours.

Leaking the container to 1 atm, open the container and put the powders into 1000 ml 6N NaOH solution to make sure the powders dissolve fully. Filter precipitates and measure the concentration of NaBH$_4$ dissolved in alkali solution. The results are shown in Table 1.

TABLE 1

| | |
|---|---|
| $NaBO_2$ (g) | 65.8 |
| Mg (g) | 60 |
| FeTi (g) | 3 |
| Concentration of $NaBH_4$ (mol/L) | 0.937 |
| Transferring ratio of $NaBH_4$ (%) | 94 |

EXAMPLE 2

Replace the 65.8 g $NaBO_2$ used example 1 into 60 g $Na_2B_4O_7$, the other conditions are the same as example 1. The results are shown in Table 2.

TABLE 2

| | |
|---|---|
| $Na_2B_4O_7$ (g) | 60.0 |
| Mg (g) | 60 |
| FeTi (g) | 3 |
| Concentration of $NaBH_4$ (mol/L) | 0.642 |
| Transferring ratio of $NaBH_4$ (%) | 96.3 |

EXAMPLE 3

Mechanically mix 60 g aluminum powder with 10 g 10 wt % Pt coated carbon black and pulverizes them in a closed container under 5 atm-hydrogen gas protection for 3 hours. Leaking the container for 1 atm. Add non-aqueous sodium boron oxide $NaBO_2$ 65.8 g into this container. Mechanically mix and pulverize them at ambient temperature. 50 atm-hydrogen gas for 24 hours.

Leaking the container to 1 atm, open the container and put the powders into 1000-ml liquid ammonia to make sure they dissolve fully. Filter precipitates and evaporating liquid ammonia, what's left is pure $NaBH_4$. The results are shown in Table 3.

TABLE 3

| | |
|---|---|
| $NaBO_2$ (g) | 65.8 |
| Al (g) | 60 |
| Pt-coated carbon (g) | 10 |
| $NaBH_4$ (g) | 13.38 |
| Transferring ratio of $NaBH_4$ (%) | 35.4 |

EXAMPLE 4

Replace the 65.8-g $NaBO_2$ used in Example 3 with 60 g $Na_2B_4O_7$, the other conditions is the same as in example 3. The results are shown in Table 4.

TABLE 4

| | |
|---|---|
| $Na_2B_4O_7$ (g) | 60.0 |
| Al (g) | 60 |
| Pt-coated carbon (g) | 10 |
| $NaBH_4$ (g) | 8.46 |
| Transferring ratio of $NaBH_4$ (%) | 33.6 |

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined by the appended claims.

What is claimed is:

1. A process for synthesizing metal borohydride alkali solutions which comprises:
    synthesizing a carrier powder for proton H;
    bonding hydrogen to said carrier powder;
    producing metal borohydride powder from said carrier powder;
    treating said metal borohydride powder with an alkali solution to produce a metal borohydride alkali solution.

2. The process according to claim 1 wherein synthesizing a carrier powder for proton H comprises:
    forming a mixture including a metal that is capable of forming hydrides with hydrogen and a hydrogen storage alloy;
    mechanically pulverizing said mixture;
    mechanically mixing the resulting pulverized mixture with an alkali compound; and
    subjecting the resulting mixture to water vapor at less than one atmosphere to produce a proton H carrier powder.

3. The process according to claim 1 wherein synthesizing a carrier powder for proton H comprises:
    forming a mixture of a first metal with a carbon black coated with a second metal selected from the group consisting of platinum, palladium and mixtures and alloys thereof; and
    mechanically pulverizing said mixture.

4. The process according to claim 1 wherein bonding hydrogen to said proton H carrier powder comprises subjecting said proton H carrier powder to hydrogen gas at a temperature from ambient to 400° C. so that hydrogen is carried by said carrier powder.

5. The process according to claim 1 wherein producing a metal borohydride powder from said proton H carrier powder comprises mixing a quantity of said proton H carrier powder with a non-aqueous metal boron oxide or borax and pulverizing the resulting mixture under hydrogen gas so that a metal borohydride powder is produced.

6. The process according to claim 1 wherein treating of said metal borohydride powder with an alkali solution comprises adding said metal borohydride powder to an alkali solution; and
    filtering out precipitates, leaving metal borohydride alkali solution.

7. A process for synthesizing substantially pure metal borohydrides which comprises:
    synthesizing a carrier powder for proton H;
    bonding hydrogen to said carrier powder;
    producing a metal borohydride powder from said carrier powder;
    dissolving said metal borohydride powder with a solvent;
    filtering precipitates; and
    evaporating said solvent to leave substantially pure metal borohydride.

8. The process according to claim 7 wherein synthesizing a carrier powder for proton H comprises:
    forming a mixture including a metal that is capable of forming hydrides with hydrogen and a hydrogen storage alloy;
    mechanically pulverizing said mixture;
    mechanically mixing the resulting pulverized mixture with an alkali compound; and
    subjecting the resulting mixture to water vapor at less than one atmosphere to produce a proton H carrier powder.

9. The process according to claim 7 wherein synthesizing a carrier powder for proton H comprises:

forming a mixture of a first metal with a carbon black coated with a second metal selected from the goup consisting of platinum, palladium and mixtures and alloys thereof; and mechanically pulverizing said mixture.

10. The process according to claim 7 wherein bonding hydrogen to said proton H carrier powder comprises subjecting said proton H carrier powder to hydrogen gas at a temperature from ambient to 400° C. so that hydrogen is carried by said carrier powder.

11. The process according to claim 7 wherein producing a metal borohydride powder from said carrier comprises mixing a quantity of said proton H carrier powder with a nonaqueous metal boron oxide or borax and pulverizing the resulting mixture under hydrogen gas so that a metal borohydride powder is produced.

12. The process according to claim 7 including forming a substantially pure metal borohydride by dissolving said metal borohydride powder into a liquid that can dissolve metal borohydrides;

filtering the resulting solution; and evaporating the resulting liquid to obtain substantially pure metal borohydride.

13. A process of synthesizing metal borohydrides which comprises:

forming a mixture including a a metal that is capable of forming hydrides with hydrogen and a hydrogen storage alloy;

mechanically pulverizing said mixture;

mechanically mixing the resulting pulverized mixture with an alkali compound;

subjecting the resulting mixture to water vapor at less than one atmosphere to produce a proton H carrier powder;

subjecting said proton H carrier powder to hydrogen gas at a temperature from ambient to 400° C. so that hydrogen is carried by said carrier powder;

mixing a quantity of said carrier powder with metal boron oxide or borax and pulverizing the resulting mixture under hydrogen gas so that a metal borohydride powder is produced;

adding said metal borohydride powder to an alkali solution; and filtering out precipitates, leaving a metal borohydride alkali solution.

14. A process of synthesizing substantially pure metal borohydride which comprises:

forming a mixture including a a metal that is capable of forming hydrides with hydrogen and a hydrogen storage alloy;

mechanically pulverizing said mixture;

mechanically mixing the resulting pulverized mixture with an alkali compound;

subjecting the resulting mixture to water vapor at less than one atmosphere to produce a proton H carrier powder;

subjecting said proton H carrier powder to hydrogen gas at a temperature from ambient to 400° C. so that hydrogen is carried by said carrier powder;

mixing a quantity of said carrier powder with boron oxide or borax and pulverizing the resulting mixture under hydrogen gas so that a metal borohydride powder is produced;

dissolving said metal borohydride powder into a liquid that can dissolve metal borohydrides;

filtering the resulting solution; and evaporating said liquid to obtain substantially pure metal borohydride.

* * * * *